US012772061B2

(12) United States Patent
Xiong

(10) Patent No.: US 12,772,061 B2
(45) Date of Patent: Oct. 20, 2026

(54) NETWORK ATTACK HANDLING METHOD AND APPARATUS, DEVICE, COMPUTER-READABLE STORAGE MEDIUM, AND COMPUTER PROGRAM PRODUCT

(71) Applicant: Tencent Technology (Shenzhen) Company Limited, Guangdong (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 614 days.

(21) Appl. No.: 17/986,844

(22) Filed: Nov. 14, 2022

(65) Prior Publication Data

US 2023/0164566 A1 May 25, 2023

Related U.S. Application Data

(63) Continuation of application No. PCT/CN2022/078330, filed on Feb. 28, 2022.

(30) Foreign Application Priority Data

Apr. 2, 2021 (CN) ........................ 202110363832.X

(51) Int. Cl.
*H04W 12/122* (2021.01)
*H04W 12/082* (2021.01)

(52) U.S. Cl.
CPC ....... *H04W 12/122* (2021.01); *H04W 12/082* (2021.01)

(58) Field of Classification Search
CPC ............. H04W 12/122; H04W 12/082; H04W 12/121; H04L 63/1458
See application file for complete search history.

(56) References Cited

U.S. PATENT DOCUMENTS

2005/0114880 A1* 5/2005 Gould ................ H04L 61/5046 725/111
2015/0042792 A1* 2/2015 Krischer ................ H04N 7/18 709/224

(Continued)

FOREIGN PATENT DOCUMENTS

CN 110351229 A 10/2019
CN 110830422 A 2/2020

(Continued)

OTHER PUBLICATIONS

International Search Report and Written Opinion in PCT/CN2022/078330, mailed May 23, 2022, 12 pages.

(Continued)

*Primary Examiner* — Mazda Sabouri
(74) *Attorney, Agent, or Firm* — ARENTFOX SCHIFF LLP

(57) ABSTRACT

A network attack handling method includes identifying, in a mobile network, a network attack from an electronic device, and, in response to the identifying the network attack, limiting, by a session management function (SMF) of the mobile network, use, by the electronic device, of a protocol data unit (PDU) session carrying a message for triggering a core network element to participate in the network attack.

19 Claims, 7 Drawing Sheets

(56) References Cited

U.S. PATENT DOCUMENTS

| | | | | |
|---|---|---|---|---|
| 2019/0306188 | A1* | 10/2019 | Medvedovsky | H04L 63/1425 |
| 2020/0204581 | A1* | 6/2020 | Manadhata | H04L 61/4511 |
| 2020/0351244 | A1* | 11/2020 | Moore | H04L 63/20 |
| 2022/0264307 | A1* | 8/2022 | Sasi | H04L 63/1458 |
| 2023/0156579 | A1* | 5/2023 | Thiebaut | H04W 48/16<br>370/329 |

FOREIGN PATENT DOCUMENTS

| | | | |
|---|---|---|---|
| CN | 111770490 | A | 10/2020 |
| CN | 113114650 | A | 7/2021 |

OTHER PUBLICATIONS

3rd Generation Partnership Project; Technical Specification Group Services and Systemt Aspects; Study on security aspects of enablers for Network Automation (eNA) for the 5G system (5GS) Phase 2; (Release 17), 3GPP TR 33.866, V0.4.0, 3GPP, Mar. 11, 2021, 30 pages.

* cited by examiner

NETWORK ATTACK HANDLING METHOD AND APPARATUS, DEVICE, COMPUTER-READABLE STORAGE MEDIUM, AND COMPUTER PROGRAM PRODUCT

RELATED APPLICATIONS

This application is a continuation of International Application No. PCT/CN2022/078330, filed on Feb. 28, 2022, which claims priority to Chinese Patent Application No. 202110363832.X filed on Apr. 2, 2021. The entire disclosures of the prior applications are hereby incorporated by reference.

FIELD OF THE TECHNOLOGY

This application relates to the field of mobile communications, including a network attack handling method and apparatus, a device, a computer-readable storage medium, and a computer program product.

BACKGROUND OF THE APPLICATION

In edge computing scenarios, domain name system (DNS) queries sent by a user equipment may be processed by an edge application server discovery function (EASDF).

A session management function (SMF) provides EASDF with a reporting rule and a forwarding rule. The reporting rule provides a rule for the EASDF to send a report to SMFs, and the forwarding rule provides a rule for EASDF to forward messages. After the UE sends a DNS query to the EASDF, the EASDF sends a report to the SMF according to the reporting rule.

In a case that an upstream peak rate is relatively high, if the UE frequently transmits DNS queries to the EASDF in a short time by malicious means, causing the EASDF to frequently transmit reports to the SMF and trigger multiple signaling messages on a control plane, a signaling storm of a mobile communication system is formed, resulting in a denial of service (DOS) attack, and thereby the mobile communication system is unable to provide services to all normal UEs. Therefore, the quality of service of the mobile communication system is low.

SUMMARY

Embodiments of this disclosure provide a network attack handling method and apparatus, a device, a computer-readable storage medium, and a computer program product, which can effectively limit a network attack and thereby the quality of service of a mobile communication system can be improved.

In an embodiment, a network attack handling method includes identifying, in a mobile network, a network attack from an electronic device, and, in response to the identifying the network attack, limiting, by a session management function (SMF) of the mobile network, use, by the electronic device, of a protocol data unit (PDU) session carrying a message for triggering a core network element to participate in the network attack.

In an embodiment, a network attack handling method includes identifying, by a session management function (SMF) in a mobile network, a network attack from an electronic device, and, in response to the identifying the network attack, limiting, by the electronic device, use of a protocol data unit (PDU) session based on a limitation initiated by the SMF, the PDU session carrying a message for triggering a core network element to participate in the network attack.

In an embodiment, an apparatus includes processing circuitry configured to identify, in a mobile network, a network attack from an electronic device, and, in response to the identifying the network attack, limit use, by the electronic device, of a protocol data unit (PDU) session carrying a message for triggering a core network element to participate in the network attack.

The technical solutions provided in the embodiments of this disclosure achieve at least the following beneficial effects: In a case of identifying a network attack from a terminal, a SMF limits the terminal from using a target PDU session. In this way, abuse of the target PDU session by the terminal is limited, so that the occurrence probability of a DOS attack or DDOS attack caused by frequent transmission of a target message by the terminal can be reduced, thereby achieving defense against the DOS attack or DDOS attack initiated by an abnormal UE and ensuring that the mobile communication system provides services for more UEs as much as possible. Therefore, the network attack can be effectively limited and thereby the quality of service of the mobile communication system can be improved.

BRIEF DESCRIPTION OF THE DRAWINGS

To describe the technical solutions in the embodiments of this disclosure, the following briefly introduces the accompanying drawings required for describing the embodiments. The accompanying drawings in the following description merely show some embodiments of this disclosure, and a person of ordinary skill in the art may still derive other drawings from these accompanying drawings.

DESCRIPTION OF EMBODIMENTS

Figure 1:
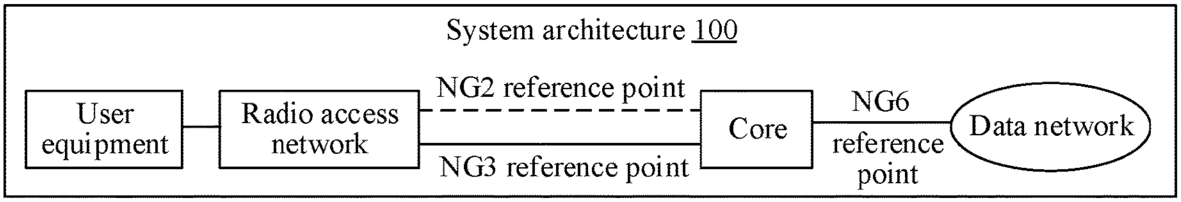
FIG. 1 is a schematic diagram of an exemplary communication system architecture according to an embodiment of this disclosure.

Embodiments of this disclosure are described in detail herein, and examples of the embodiments of this disclosure are shown in the accompanying drawings. When the following descriptions are made with reference to the accompanying drawings, unless otherwise indicated, the same numbers in different accompanying drawings represent the same or similar elements. The following implementations described below embodiments of this disclosure do not represent all implementations that are consistent with this disclosure. On the contrary, the implementations are merely examples of apparatuses and methods that are described in detail in the appended claims and consistent with some aspects of this disclosure.

In an edge computing scenario, a UE sends a target PDU session establishment request to a SMF. In response to the target PDU session establishment request, the SMF locates and select an EASDF for the UE, and the SMF sends a message to the selected EASDF, the message carrying: an Internet Protocol (IP) address of the UE, a callback uniform resource identifier (URI), and a rule for handling a DNS message. The callback URI is also referred to as a callback address, and refers to a target resource URI requested when the EASDF actively initiates a message to the SMF. The rule for handling a DNS message includes a DNS message reporting rule and a DNS message forwarding rule.

In the embodiments of this disclosure, the SMF provides the reporting rule for the EASDF, to cause the EASDF to report to the SMF. Reports of the EASDF to the SMF include at least the following two types of reports:

1. Report triggered based on DNS query:

If a fully qualified domain name(s) (FQDN) of an edge application server (EAS) in a DNS query matches a filter of the FQDN(s) in the reporting rule, the SMF may provide the reporting rule to indicate the EASDF to send the EAS FQDN(s) to the SMF. Then, the SMF provides the forwarding rule for the EASDF, so that the EASDF forwards the DNS query to a local DNS or adds an elastic compute service (ECS) property and then forwards the DNS query to a C-DNS based on the forwarding rule.

2. Report triggered based on DNS response:

The SMF provides the reporting rule to indicate the EASDF to report an EAS IP address/FQDN to the SMF. If the EAS IP address in a DNS response matches an IP address range in the reporting rule, or the FQDN of the DNS response matches the FQDN in the DNS message reporting rule, the SMF may perform an uplink classifier (UL CL) insertion operation, which introduces relatively great amount of signaling interaction. For example, a UE, a radio access network (RAN), an access and mobility management function (AMF), an intermediate user port function (I-UPF), and a user plane network element (L-PSA) are all involved in the signaling interaction.

Because the SMF configures the reporting rule for the EASDF, when the UE sends a DNS query to the EASDF, the EASDF may be triggered to send a report (or report a message) to the SMF. The report triggers subsequent signals and messages. For example, an uplink peak rate of the 5th generation mobile communication technology (5G) may reach 300 Mbps, that is, a UE may upload data of 300 Mb in one second by calculating: 300 M/8/1500=25,000 DNS queries per UE per second, where 8 is the number of bits in a byte, and a length of a DNS query is assumed to be 1500 bytes.

Because a DNS query may trigger the signaling interaction with the SMF and may trigger signaling of the UL CL insertion operation of the SMF simultaneously, a signaling storm of the mobile communication system is formed, causing a DOS attack, and thereby the mobile communication system cannot serve all normal UEs (because signaling of the 5G system is easily occupied by DOS, and the mobile communication system may serve only a part of normal UEs or may be completely unable to serve all normal UEs).

Additionally, multiple UEs may simultaneously send the DNS query to the EASDF through collaboration of different cells. This may result in a distributed denial of service (DDOS) attack, creating a more serious attack and causing the mobile communication system to be almost unable to serve normal UEs.

In addition, the SMF can also implement a function of a dynamic host configuration protocol (DHCP) service, the DHCP service being used for configuring an IP address to the UE or configuring IP-related parameters to the UE. The UE sends a large number (greater than the threshold number) of DHCP request data packets to the SMF through an interface (N4 interface) between a control plane and a forwarding plane with a high speed of the user plane, thereby generating a large amount of signaling of the N4 interface between a user plane function (UPF) and the SMF. Simultaneously, the SMF is requested to process through the large number of DHCP request data packets, which occupies the time and resource of processing DHCPs by the SMF. Therefore, a DOS attack is caused. Similarly, the DDOS attack may be achieved when multiple UEs cooperatively send a large number of DHCP request data packets to a single UPF and SMF simultaneously. An embodiment of this disclosure provides a network attack handling solution to solve the foregoing technical problems and to reduce the occurrence probability of the DOS attack and DDOS attack.

FIG. 1 is a schematic diagram of an exemplary communication system architecture according to an embodiment of this disclosure. As shown in FIG. 1, the system architecture 100 may include: a user equipment (UE) (referred to as an electronic device), a radio access network (RAN), a core, and a data network (DN). The UE, RAN, and core are main components of the system architecture 100. Logically, the UE, RAN, and core may be divided into two parts, namely a user plane and a control plane. The control plane is responsible for management of the mobile network, and the user plane is responsible for transmission of service data. In FIG. 1, an NG2 reference point is located between a RAN control plane and a core control plane, an NG3 reference point is located between a RAN user plane and a core user plane, and an NG6 reference point is located between the core user plane and the data network. The NG interface refers to an interface between the radio access network and the 5G core network.

The UE, RAN, core, and DN in FIG. 1 are respectively explained below.

UE: A UE is a portal for a mobile user to interact with the network, which can provide basic computing and storage capabilities, display a service window to the user, and accept the user to operate and input. The UE establishes a signal connection and a data connection with the RAN by using the next-generation air port technology, to transmit a control signal and service data to the mobile network.

RAN: Similar to a base station, a RAN is deployed close to the UE, provides a network access function for authorized users of cell coverage, and can transmit user data through different quality transmission tunnels according to the user's level and service requirements. The RAN can manage its own resource and properly use the resource, provide access services to the UE on demand, and forward a control signal and user data between the UE and the core.

Core: A core is responsible for maintaining contract data of the mobile network, managing a network element of the mobile network, and providing the UE with session management, mobility management, policy management, security certification, and other functions. When the UE is attached, the core provides the UE with network access authentication. When the UE has a service request, the core allocates a network resource to the UE. When the UE moves, the core updates the network resource for the UE. When the UE is idle, the core provides a quick recovery mechanism for the UE. When the UE is attached, the core releases the network resource for the UE. When the UE has service data, the core provides a data routing function for the UE, such as forwarding uplink data to the DN, or receiving UE downlink data from the DN and forwarding the UE downlink data to the RAN, thereby sending the UE downlink data to the UE.

DN: The DN is a data network that provides a business service to the user. Generally, a client is located in the UE and the server side is located in the data network. The data network may be a private network, such as a local area network, or may be an external network not regulated by the operator, such as the Internet, or may be a proprietary network co-deployed by an operator, such as configuring an IP multimedia core network subsystem (IMS) service.

Figure 2:
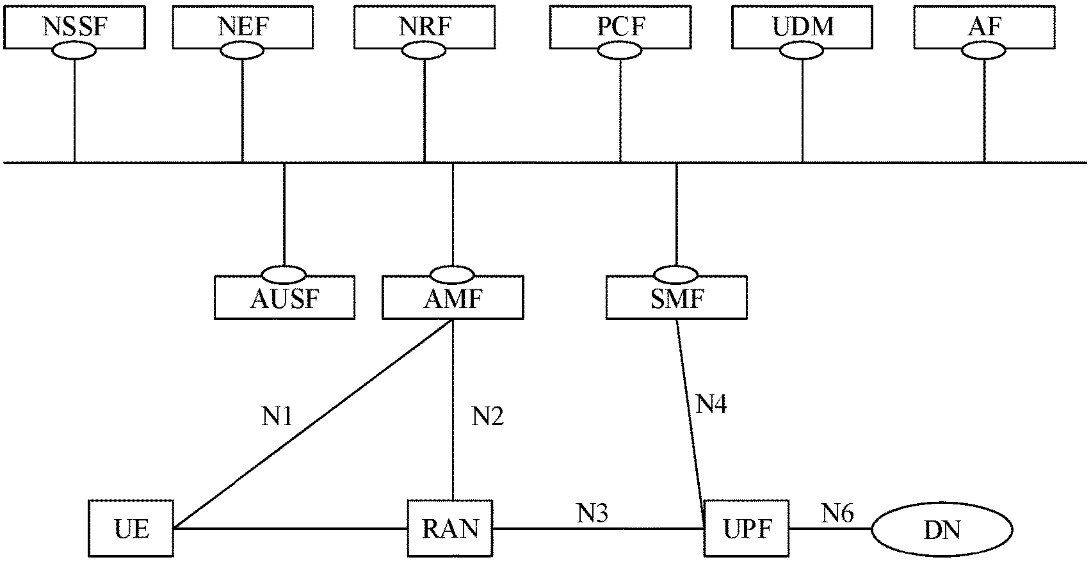
FIG. 2 is a schematic diagram of another exemplary communication system architecture according to an embodiment of this disclosure.

FIG. 2 is a detailed architecture determined on the basis of FIG. 1. The core network user plane includes a UPF. The core network control plane includes an authentication server function (AUSF), an AMF, a SMF, a network slice selection function (NSSF), a network exposure function (NEF), an NF repository function (NRF), a unified data management (UDM), a policy control function (PCF), and an application function (AF). The following describes the functions of each functional entity.

UPF: Forwarding user data packets according to a SMF routing rule. AUSF: Performing safety certification of the UE. AMF: Access and mobility management. SMF: Session management. NSSF: Selecting a network slice for the UE. NEF: Starting a network function to a third party through an API interface. NRF: Providing a storage function and a selection function of network function entity information for other network elements. UDM: User contract context management. PCF: User policy management. AF: User application management.

In the architecture shown in FIG. 2, an N1 interface is a reference point between the UE and the AMF. An N2 interface is a reference point between the RAN and the AMF, and is used for sending network attached storage (NAS) messages, and the like. An N3 interface is a reference point between the RAN and the UPF, and is used for transmitting data of the user plane, and the like. An N4 interface is a reference point between the SMF and the UPF, and is used for transmitting information such as tunnel identification information of the N3 interface, data cache indication information, and downlink data notification messages. An N6 interface is a reference point between the UPF and the DN, and is used for transmitting data of the user plane, and the like.

The names of the interfaces between the network elements in FIG. 1 and FIG. 2 are merely an example. The interfaces in the specific implementation may have other names, which is not specifically limited in the embodiments of this disclosure. The names of the network elements (such as SMF, AF, and UPF) included in FIG. 1 and FIG. 2 are merely an example as well, and do not constitute a limitation on the function of the network elements. In the 5G system and other networks in the future, the network elements may alternatively have other names, which is not specifically limited in the embodiments of this disclosure. For example, in the 6th generation mobile communication technology (6G) network, some or all of the network elements may still use the terminology in 5G or may have other names, etc., which are described herein together, and details are not described below again. In addition, it is to be understood that the names of messages (or signaling) transmitted between the foregoing network elements are merely an example as well, and do not constitute any limitation on the function of the messages.

Figure 3:
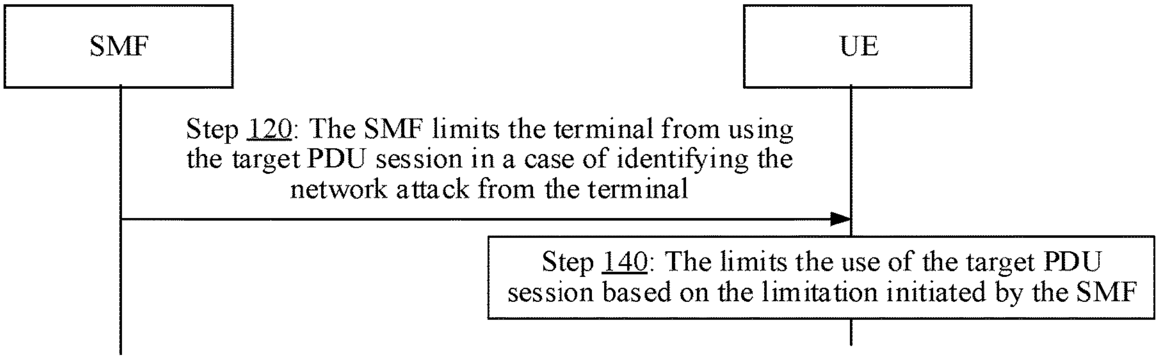
FIG. 3 is a flowchart of an exemplary network attack handling method according to an embodiment of this disclosure.

FIG. 3 is a flowchart of an exemplary network attack handling method according to an embodiment of this disclosure. This embodiment of this disclosure is described by using an example in which the network attack handling method is performed by the SMF and the UE. As shown in FIG. 3, the network attack handling method includes steps 120 and 140, and the steps are respectively described below.

Step 120: The SMF limits the terminal from using the target PDU session in a case of identifying the network attack from the terminal. For example, in a mobile network, a network attack from an electronic device is identified. In response to identifying the network attack, use, by the electronic device, of a protocol data unit (PDU) session is limited by a session management function (SMF) of the mobile network. The PDU session carries a message for triggering a core network element to participate in the network attack.

In an embodiment, the SMF identifies the network attack and the electronic device limits use of a PDU session based on a limitation initiated by the SMF. The PDU session carries a message for triggering a core network element to participate in the network attack.

The network attack includes: behaviors of a DOS attack or a DDOS attack initiated by the terminal to the SMF based on the target PDU session.

Exemplarily, behaviors that may cause the network attack include: at least one of sending a DNS query and sending a DHCP request. Sending a DNS query is a behavior of triggering an EASDF to send a report to the SMF, and sending a DHCP request is a behavior of triggering a UPF to forward a message to the SMF.

In an example, in a case that a transmission rate of DNS queries reaches a first threshold number of queries, the SMF determines that the network attack from the terminal is identified. In an example, in a case that a transmission rate of DHCP requests reaches a second threshold number of requests, the SMF determines that the network attack from the terminal is identified. In an example, in a case that a transmission rate of DHCP requests of an abnormal type reaches a third threshold number of requests, the SMF determines that the network attack from the terminal is identified. The DHCP request of the abnormal type includes: at least one of a duplicate DHCP request and an invalid DHCP request. The duplicate DHCP request refers to the same DHCP request, and the invalid DHCP request refers to a meaningless DHCP request or a maliciously constructed DHCP request.

The transmission rate of the DNS queries may be calculated from the report sent by the EASDF and received by the SMF, the report being triggered by the DNS query sent by the UE to the EASDF for report. The transmission rate of the DHCP request may be calculated from the DHCP requests forwarded according to the UPF by the SMF.

The limiting the terminal from using the target PDU session includes at least one of the following: releasing the target PDU session of the terminal; deregistering the terminal to limit the terminal to stopping using the target PDU session; and limiting a data radio bearer (DRB) in the target PDU session to limit a maximum bit rate.

The limiting a maximum bit rate is to limit an aggregate maximum bit rate (AMBR) of the terminal, an AMBR of the target PDU session, or a maximum bit rate (MBR) of a specific QoS flow. The target PDU session carries a target message, the target message being a data packet for triggering a target core network element to initiate the network attack to the SMF.

In this embodiment of this disclosure, the target message includes: at least one of a DNS query and a DHCP request.

Step 140: The terminal limits the use of the target PDU session based on the limitation initiated by the SMF.

The SMF initiates a release process of the target PDU session of the terminal to the UPF in a case of identifying the network attack from the terminal.

In this embodiment of this disclosure, a first backoff time is indicated to the terminal in the release process, the first backoff time being a duration during which the terminal is prohibited from establishing the target PDU session.

Figure 5:
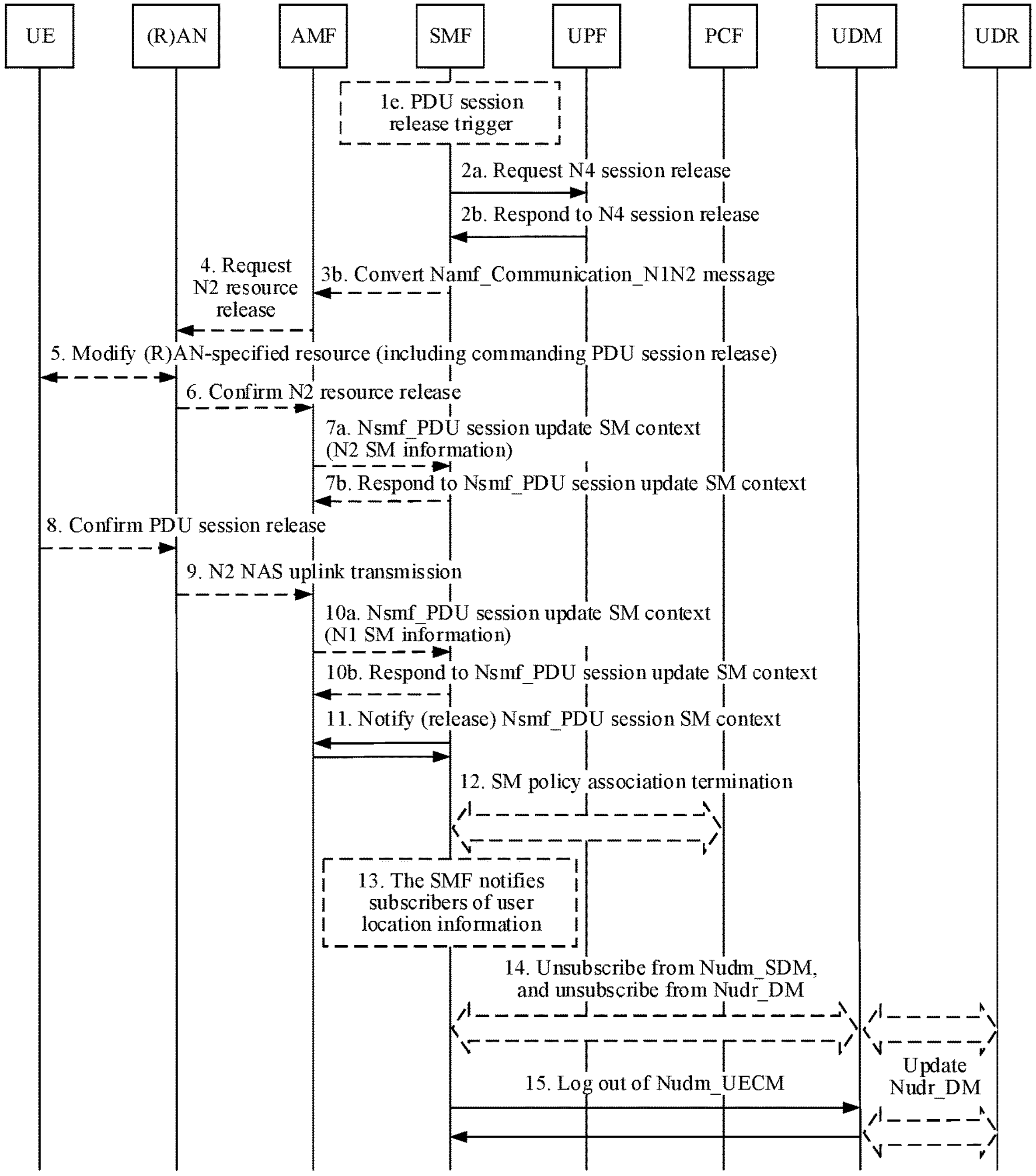
FIG. 5 is a flowchart of an exemplary PDU session release process according to an embodiment of this disclosure.

FIG. 5 shows a PDU session release process defined in Section 4.3.4.2 of the communication protocol TS 23.502 of the third generation partnership project (3GPP) (the steps are not individually described in this embodiment of this disclosure). In addition, this embodiment of this disclosure further includes the following step: The SMF initiates a releasing process of the target PDU session in step 1*e* in a case of identifying the network attack from the terminal. Meanwhile, a PDU session release command is carried in three messages shown in step 3*b*, step 4, and step 5, and the message structure of the PDU session release command is shown in Table 1 below.

TABLE 1

| Cell identifier | Cell | Type/Reference | Mandatory/Optional | Format | Length |
|---|---|---|---|---|---|
| | Extended protocol identifier | Extended protocol identifier | Mandatory | V | 1 |
| | PDU session identifier | PDU session identifier | Mandatory | V | 1 |
| | PTI | Program transaction identifier | Mandatory | V | 1 |
| | PDU session release command message identifier | Information type | Mandatory | V | 1 |
| | 5GSM reason | 5GSM reason | Mandatory | V | 1 |
| 37 | Backoff time value | GPRS timer 3 | Optional | TLV | 3 |
| 78 | EAP message | EAP message | Optional | TLV-E | 7-1503 |
| 61 | 5GSM congestion retry indicator | 5GSM congestion retry indicator | Optional | TLV | 3 |
| 7B | Extended protocol configuration option | Extended protocol configuration option | Optional | TLV-E | 4-65538 |
| D- | Access type | Access type | Optional | TV | 1 |

In conclusion, in the method provided by this embodiment of this disclosure, in a case of identifying a network attack from a terminal, a SMF limits the terminal from using a target PDU session. In this way, abuse of the target PDU session by the terminal can be limited, a DOS attack or DDOS attack caused by frequent transmission of a target message by the terminal can be avoided, thereby achieving defense against the DOS attack or DDOS attack initiated by an abnormal UE, and ensuring that the mobile communication system provides services for more UEs as much as possible.

Implementation 1 of limiting the terminal from using the target PDU session (releasing the target PDU session of the terminal) is described below.

Figure 4:
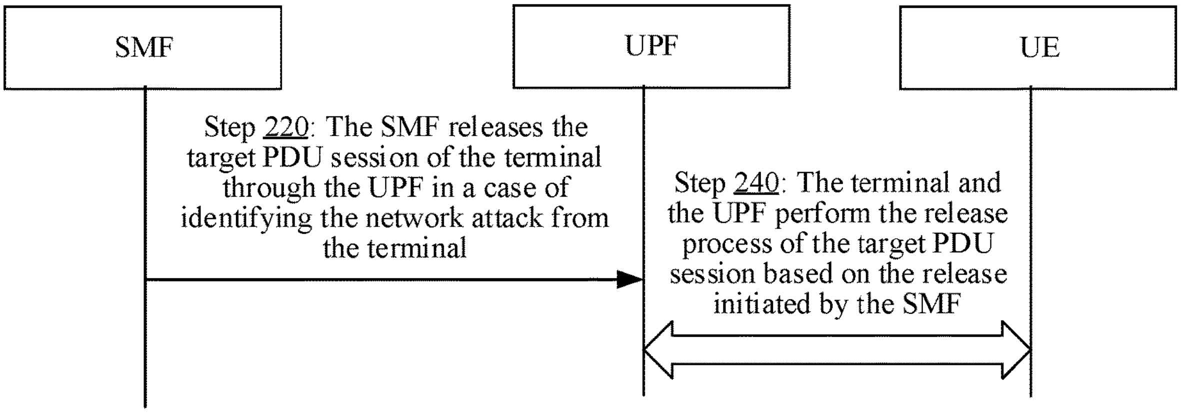
FIG. 4 is a flowchart of another exemplary network attack handling method according to an embodiment of this disclosure.

FIG. 4 is a flowchart of another exemplary network attack handling method according to an embodiment of this disclosure. This embodiment of this disclosure is described by using an example in which the network attack handling method is performed by the SMF and the UE. As shown in FIG. 4, the network attack handling method includes steps 220 and 240, and the steps are respectively described below.

Step 220: The SMF releases the target PDU session of the terminal through the UPF in a case of identifying the network attack from the terminal.

In this embodiment of this disclosure, in a backoff time domain of the PDU session release command, a first backoff time is indicated to the UE.

In this embodiment of this disclosure, a reason value is added to the 5GSM reason of the PDU session release command: a reason of an abnormal UE.

In this embodiment of this disclosure, the value of the 5GSM congestion retry indicator of the PDU session release command is 0 or 1.0 represents that the first backoff time is applicable to the public land mobile network (PLMN) historically accessed to; and 1 represents that the first backoff time is applicable to all PLMNs.

Step 240: The terminal and the UPF perform the release process of the target PDU session based on the release initiated by the SMF.

After receiving a release indication initiated by the SMF, the UPF and the terminal perform the release process of the target PDU session.

If the first backoff time is indicated to the terminal in the release process, the terminal is prohibited from re-establishing the target PDU session before the first backoff time is timed out.

In conclusion, in the network attack handling method provided by this embodiment of this disclosure, in a case of identifying a network attack from a terminal, a SMF initiates a release process to release a target PDU session on the terminal. In this way, abuse of the target PDU session by the terminal is limited, a DOS attack or DDOS attack caused by frequent transmission of a target message by the terminal can be avoided, thereby achieving defense against the DOS attack or DDOS attack initiated by an abnormal UE, and ensuring that the mobile communication system provides services for more UEs as much as possible.

Implementation 2 of limiting the terminal from using the target PDU session (deregistering the terminal) is described below.

Figure 6:
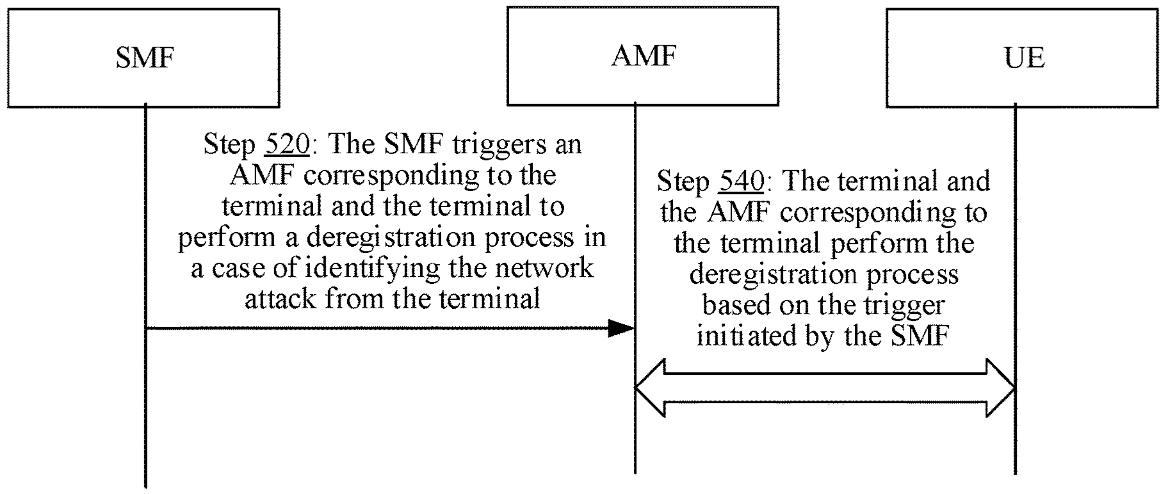
FIG. 6 is a flowchart of a still another exemplary network attack handling method according to an embodiment of this disclosure.

FIG. 6 is a flowchart of a still another exemplary network attack handling method according to an embodiment of this disclosure. This embodiment of this disclosure is described by using an example in which the network attack handling method is performed by the SMF and the UE. As shown in FIG. 6, the network attack handling method includes steps 520 and 540, and the steps are respectively described below.

Step 520: The SMF triggers an AMF corresponding to the terminal and the terminal to perform a deregistration process in a case of identifying the network attack from the terminal.

In this embodiment of this disclosure, a second backoff time is indicated to the terminal in the deregistration process, the second backoff time being a duration during which the terminal is prohibited from initiating a registration process.

Figure 7:
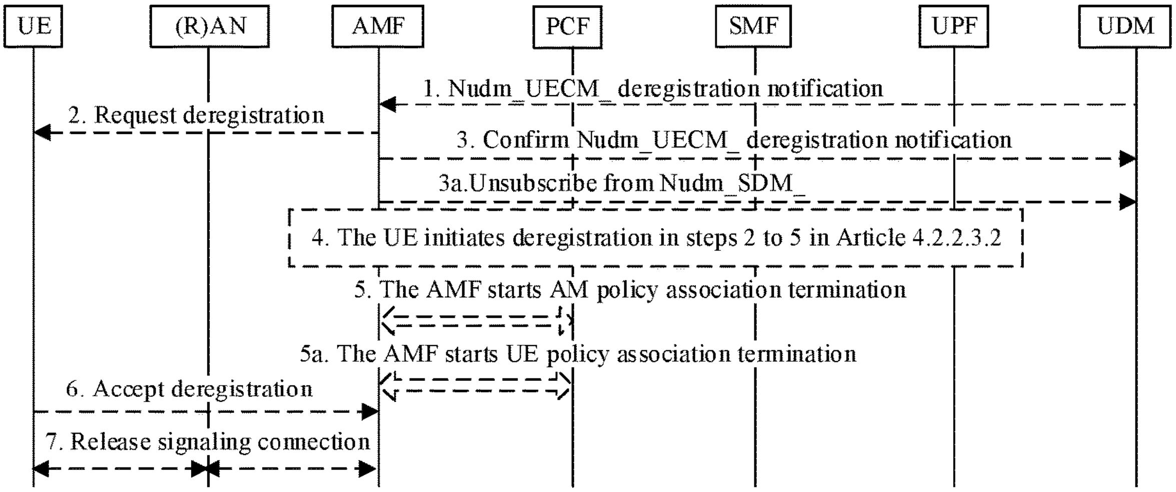
FIG. 7 is a flowchart of an exemplary deregistration process initiated based on a network according to an embodiment of this disclosure.

FIG. 7 shows a deregistration process initiated by the network and defined in Section 4.2.2.3.3-1 of the 3GPP communication protocol TS 23.502 (steps are not individually described in this embodiment of this disclosure). In addition, this embodiment of this disclosure further includes: step 1 in FIG. 7 need not be performed. The deregistration request in step 2 further includes the second backoff time, and the UE is not allowed to initiate the registration process to the 5G network before the second backoff time is timed out. Even if the UE is turned off, the second backoff time will not be invalid, that is, the UE cannot turn the UE off and then turn the UE on again to avoid the second backoff time.

In this embodiment of this disclosure, the SMF sends a network attack event to a network management system in a case of identifying the network attack from the terminal, the network attack event being used for triggering the network management system to initiate the deregistration process to the AMF corresponding to the terminal. Exemparily, the SMF transmits an event exposure notification of an Nsmf interface based on a SMF service to the network management system, the event exposure notification being used for notifying the network management system of the network attack event.

In this embodiment of this disclosure, the SMF sends the network attack event to the network data analytics function (NWDAF) in a case of identifying the network attack from the terminal, the network attack event being used for triggering the NWDAF to initiate the deregistration process to the AMF corresponding to the terminal. Exemparily, the SMF transmits an event exposure notification of an Nsmf interface to the NWDAF, the event exposure notification being used for notifying the NWDAF of the network attack event.

In this embodiment of this disclosure, the event exposure notification of the Nsmf interface carries an identifier of the terminal.

In this embodiment of this disclosure, the event exposure notification of the Nsmf interface carries a DOS indication domain. The DOS indication domain is used for indicating the type of the DOS attack, such as a DHCP request attack or a DNS query attack. The event exposure notification of the Nsmf interface further carries DOS information. The DOS information carries characteristics of a data packet of this network attack, such as quintuple information of the data packet. In addition, the network management system or the NWDAF may further determine whether a DOS attack is present from other information in the mobile communication system.

In this embodiment of this disclosure, after the network management system or the NWDAF identifies the network attack behavior by the UE, the network management system finds the AMF of the UE according to the identifier of the UE, and sends the indication information of the DOS attack of the UE to the AMF. And, the NWDAF sends the indication information of the DOS attack of the UE to the AMF through an analytics subscription notification request of the NNWDAF interface. After the AMF receives the indication information of the DOS attack of the UE, the AMF decides to perform the deregistration process initiated by the AMF according to the network configuration or instructions of operation administration and maintenance (OAM).

The message structure of the deregistration request in step 2 in FIG. 7 is shown in Table 2 below.

TABLE 2

| Cell identifier | Cell | Type/Reference | Mandatory/Optional | Format | Length |
|---|---|---|---|---|---|
| | Extended protocol identifier | Extended protocol identifier | Mandatory | V | 1 |
| | Security title type | Security title type | Mandatory | V | 1/2 |
| | Standby half octet byte | Standby half octet byte | Mandatory | V | 1/2 |
| | Logout request message identifier | Information type | Mandatory | V | 1 |
| | Logout type | Logout type | Mandatory | V | 1/2 |
| | Standby half octet byte | Standby half octet byte | Mandatory | V | 1/2 |
| 58 | 5GMM reason | 5GMM reason | Optional | TV | 2 |
| 5F | T3346 value | GPRS timer 2 | Optional | TLV | 3 |
| 6D | Reject NSSAI | Reject NSSAI | Optional | TLV | 4-42 |

In the message of the deregistration request, the T3346 value is used for setting a second backoff time, that is, the UE is not allowed to initiate the registration process while the timer is still running.

In the message of the deregistration request, the 5GMM reason may indicate: an abnormal UE behavior.

The format TLV in Table 1 and Table 2 is Type, Length, and Value. Type is a message type, Length is the length of a value, and Value is an actual value. The lengths of T and L are fixed, and the length of V is specified by Length. TLV-E refers to an extended TLV format, TV is a message type and actual value, and V is an actual value. NSSAI refers to network slice selection assistance information.

Step 540: The terminal and the AMF corresponding to the terminal perform the deregistration process based on the trigger initiated by the SMF.

In this embodiment of this disclosure, after receiving the trigger initiated by the SMF, the AMF and the terminal perform the deregistration process. After completing the deregistration process, the terminal is in an idle state.

If the second backoff time is indicated to the terminal in the deregistration process, the terminal is prohibited from performing the registration process with the AMF before the second backoff time is timed out.

In conclusion, in the network attack handling method provided by this embodiment of this disclosure, in a case of identifying a network attack from a terminal, a SMF initiates a deregistration process to deregister the terminal in an idle state, to thereby limit the terminal from sending any data. In this way, a DOS attack or DDOS attack caused by frequent transmission of a target message by the terminal can be avoided, thereby achieving defense against the DOS attack or DDOS attack initiated by an abnormal UE, and ensuring that the mobile communication system provides services for more UEs as much as possible.

Implementation 3 of limiting the terminal from using the target PDU session (deleting a data radio bearer in the target PDU session) is described below.

Figure 8:
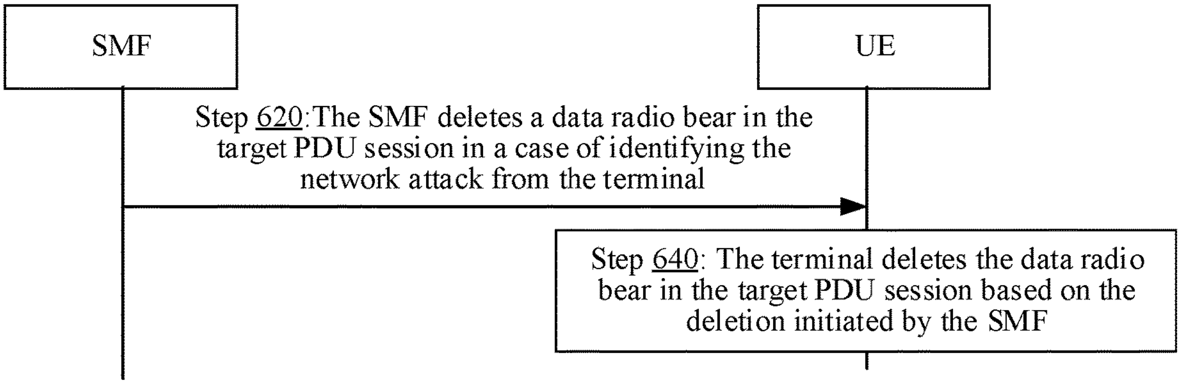
FIG. 8 is a flowchart of a still another exemplary network attack handling method according to an embodiment of this disclosure.

FIG. 8 is a flowchart of a still another exemplary network attack handling method according to an embodiment of this disclosure. This embodiment of this disclosure is described by using an example in which the network attack handling method is performed by the SMF and the UE. As shown in FIG. 8, the network attack handling method includes steps 620 and 640, and the steps are respectively described below.

Step 620: The SMF deletes a data radio bearer in the target PDU session in a case of identifying the network attack from the terminal.

In this embodiment of this disclosure, the SMF deletes the DRB in the target PDU session in a case of identifying the network attack from the terminal.

In this embodiment of this disclosure, a third backoff time is indicated to the terminal in the DRB deletion process, the third backoff time being a duration during which the terminal is prohibited from establishing the data radio bearer in the target PDU session.

Step 640: The terminal deletes the data radio bearer in the target PDU session based on the deletion initiated by the SMF.

In a case that the DRB in the target PDU session is deleted, although the terminal maintains the target PDU session, the terminal is still unable to send uplink data because the DRB is deleted.

In conclusion, in the network attack handling method provided by this embodiment of this disclosure, in a case of identifying a network attack from a terminal, a SMF deletes a data radio bearer in a target PDU session to limit the terminal to an idle state. In this way, abuse of the target PDU session by the terminal can be limited, a DOS attack or DDOS attack caused by frequent transmission of a target message by the terminal can be avoided, thereby achieving defense against the DOS attack or DDOS attack initiated by an abnormal UE, and ensuring that the mobile communication system provides services for more UEs as much as possible.

Implementation 4 of limiting the terminal from using the target PDU session (limiting a maximum bit rate) is described below.

Figure 9:
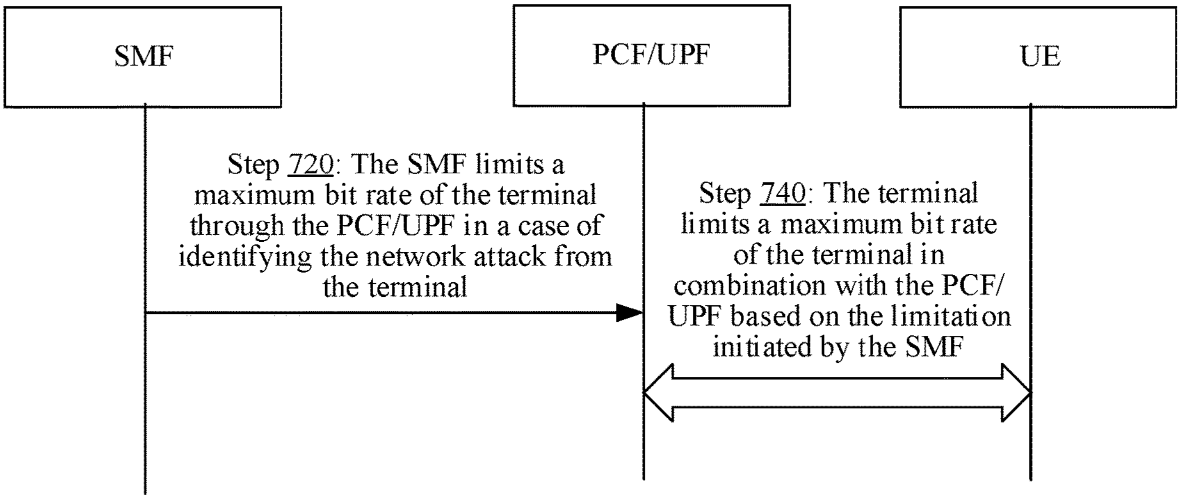
FIG. 9 is a flowchart of a still another exemplary network attack handling method according to an embodiment of this disclosure.

FIG. 9 is a flowchart of a still another exemplary network attack handling method according to an embodiment of this disclosure. This embodiment of this disclosure is described by using an example in which the network attack handling method is performed by the SMF and the UE. As shown in FIG. 8, the network attack handling method includes steps 720 and 740, and the steps are respectively described below.

Step 720: The SMF limits a maximum bit rate of the terminal through the PCF/UPF in a case of identifying the network attack from the terminal.

The SMF limits, in a case of identifying the network attack from the terminal, a maximum bit rate of the target PDU session by limiting the maximum bit rate of the terminal.

In this embodiment of this disclosure, the terminal establishes at least one PDU session with the network side, and each PDU session includes at least one quality of service (QoS flow). For the limitation of the maximum bit rate of the terminal, the maximum bit rate may be controlled by using a terminal granularity, a PDU session granularity, or a QoS flow granularity.

In this embodiment of this disclosure, when the maximum bit rate of the terminal is limited with the terminal granularity, the SMF controls an aggregate maximum bit rate (AMBR) of the terminal through the PCF. Because there is a PDU session, that is, the target PDU session, established on the terminal, the SMF sets a UE-AMBR to the terminal through the PCF, and the terminal adjusts the maximum bit rate of the entire UE according to the UE-AMBR, which is equivalent to directly adjusting the maximum bit rate of the target PDU session.

In this embodiment of this disclosure, when the maximum bit rate of the terminal is limited with the session granularity, the SMF controls an uplink session AMBR of the target PDU session through the PCF. The SMF sets the uplink session AMBR to the terminal through the PCF, and the terminal adjusts the maximum bit rate of the target PDU session according to the uplink session AMBR.

In this embodiment of this disclosure, when the maximum bit rate of the terminal is limited with the QoS granularity, the SMF controls a maximum bit rate (MBR) of a QoS flow where the target message is located through the PCF. The SMF sets the MBR of the QoS flow to the terminal through the PCF, and the terminal adjusts the maximum bit rate of the QoS flow where the target message is located according to the MBR of the QoS flow. In this embodiment of this disclosure, the target message is configured to be transmitted in a dedicated QoS flow.

Because the target message is forwarded to the EASDF or the SMF by the UE through the UPF, the SMF may alternatively limit the maximum bit rate of the terminal through the UPF. In this case, the UPF needs to identify the target message. In this embodiment of this disclosure, the SMF sets a packet detection rule (PDR) to the UPF. Therefore, because the target message includes at least one of the DNS query and the DHCP request, the PDR includes at least one of a first PDR and a second PDR. The first PDR is used for identifying the DNS query, and the second PDR is used for identifying the DHCP request.

Exemplarily, the first PDR includes at least one of the following: a PDR in which the type of data packet is a UDP data packet and a destination port number of the UDP data packet is 53; a PDR in which the type of data packet is a UDP data packet, a destination IP address of the UDP data packet is an IP address of the EASDF, and a destination port number of the UDP data packet is 53; a PDR in which the type of data packet is a TCP data packet and a destination port number of the TCP data packet is 853; a PDR in which the type of data packet is a TCP data packet, a destination IP address of the TCP data packet is an IP address of the EASDF, and a destination port number of the TCP data packet is 853 or 443.

Exemplarily, the second PDR includes: a PDR in which the type of data packet is a UDP data packet and a destination port number of the UDP data packet is 68;

In this embodiment of this disclosure, the UPF forwards the identified target PDU session or QoS flow of the target message at a limited speed according to the foregoing maximum bit rate.

Figure 10:
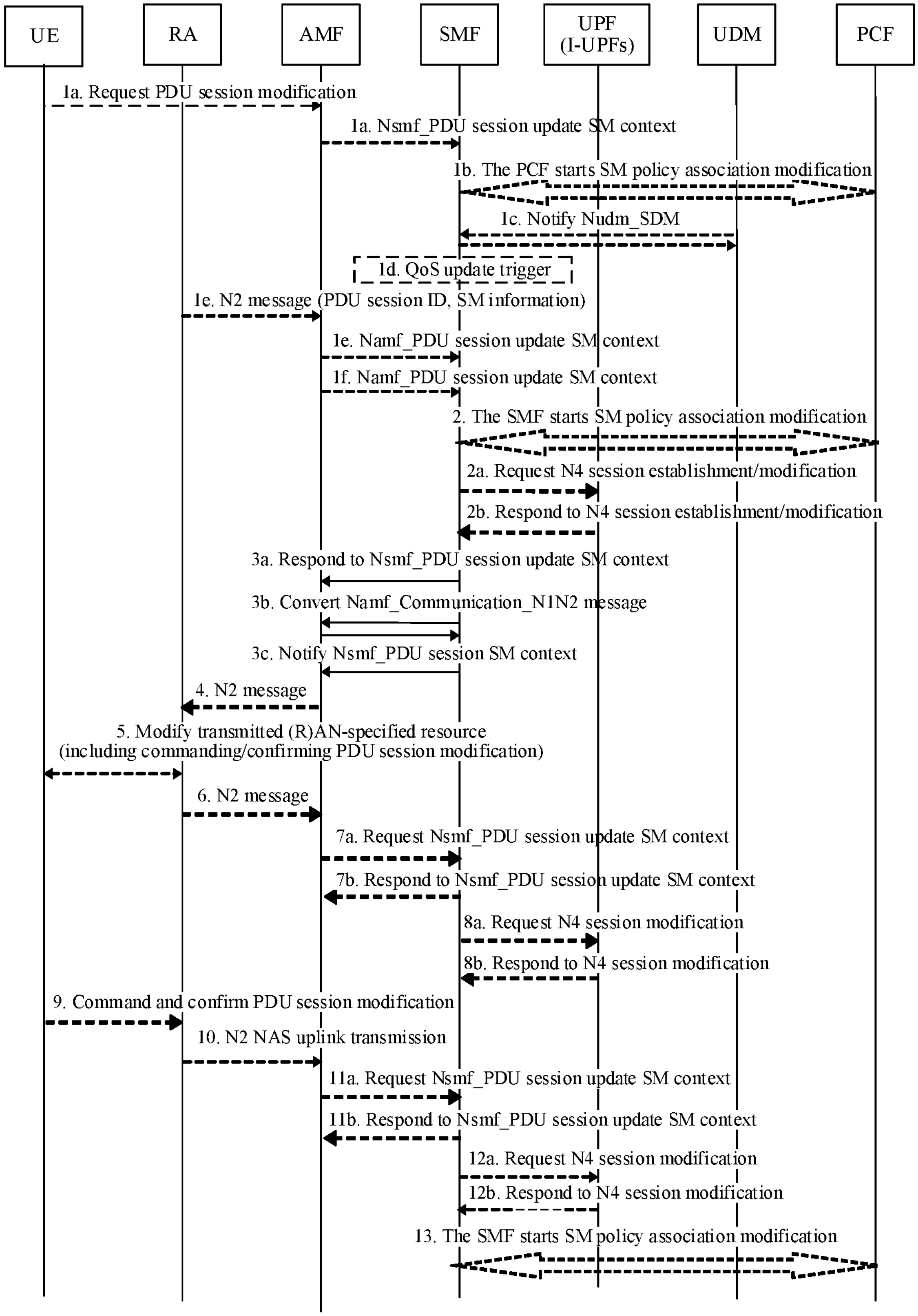
FIG. 10 is a flowchart of an exemplary PDU session modification method according to an embodiment of this disclosure.

Referring to FIG. 10, FIG. 10 shows a PDU session modification process defined in Section 4.3.3.2-1 of the communication protocol TS 23.502 of 3GPP (steps are not individually described in this embodiment of this disclosure). In this embodiment of this disclosure, the SMF can set the maximum bit rate of the terminal according to the procedure shown in FIG. 10. The message structure of a PDU session modification command shown in FIG. 10 is shown in Table 3 below.

In this embodiment of this disclosure, in a case of acquiring the uplink session AMBR, the terminal adjusts the maximum bit rate of the target PDU session according to the uplink session AMBR.

In this embodiment of this disclosure, in a case of acquiring the MBR of the QoS flow, the terminal adjusts the maximum bit rate of the QoS flow where the target message is located according to the MBR of the QoS flow. The target message is configured to be transmitted in a dedicated QoS flow.

In conclusion, in the network attack handling method provided by this embodiment of this disclosure, in a case of identifying a network attack from a terminal, a SMF limits a maximum bit rate of the terminal. In this way, a DOS attack or DDOS attack caused by frequent transmission of a target message by the terminal can be avoided, thereby achieving defense against the DOS attack or DDOS attack initiated by an abnormal UE, and ensuring that the mobile communication system provides services for more UEs as much as possible.

TABLE 3

| Cell identifier | Cell | Type/Reference | Mandatory/Optional | Format | Length |
|---|---|---|---|---|---|
| | Extended protocol identifier | Extended protocol identifier | Mandatory | V | 1 |
| | PDU session identifier | PDU session identifier | Mandatory | V | 1 |
| | PTI | Program transaction identifier | Mandatory | V | 1 |
| | PDU session modification command message identifier | Information type | Mandatory | V | 1 |
| 59 | 5GSM reason | 5GSM reason | Optional | TV | 2 |
| 2A | Session AMBR | Session AMBR | Optional | TLV | 8 |
| 56 | RQ timer value | GPRS timer | Optional | TV | 2 |
| 8- | Always-online PDU session indication | Always-online PDU session indication | Optional | TV | 1 |
| 7A | Authorized QoS rule | QoS rule | Optional | TLV-E | 7-65538 |
| 75 | Mapped EPS hosted context | Mapped EPS hosted context | Optional | TLV-E | 7-65538 |
| 79 | Authorized QoS flow property | QoS flow property | Optional | TLV-E | 6-65538 |
| 7B | Extended protocol configuration option | Extended protocol configuration option | Optional | TLV-E | 4-65538 |
| 77 | ATSSS container | ATSSS container | Optional | TLV-E | 3-65538 |
| 66 | IP header compression configuration | IP header compression configuration | Optional | TLV | 5-257 |
| 7C | Port management information container | Port management information container | Optional | TLV-E | 3-65538 |
| 1E | Service PLMN rate control | Service PLMN rate control | Optional | TLV | 4 |

The authorized QoS rule cell in the PDU session modification command may create a QoS flow dedicated to the target message, for example, configuring a PDR rule of the QoS flow dedicated to the target message and a corresponding QoS flow identifier (QoS Flow ID, QFI) of the target message. The MBR of the QoS flow dedicated to the target message may be carried in an authorized QoS flow property cell in the PDU session modification command, and the uplink session AMBR of the target PDU session may be carried in a session AMBR cell in the PDU session modification command.

Step 740: The terminal limits a maximum bit rate of the terminal in combination with the PCF/UPF based on the limitation initiated by the SMF.

In this embodiment of this disclosure, in a case of acquiring the UE-AMBR, the terminal adjusts the maximum bit rate of the entire UE according to the UE-AMBR, which is equivalent to indirectly adjusting the maximum bit rate of the target PDU session.

Figure 11:
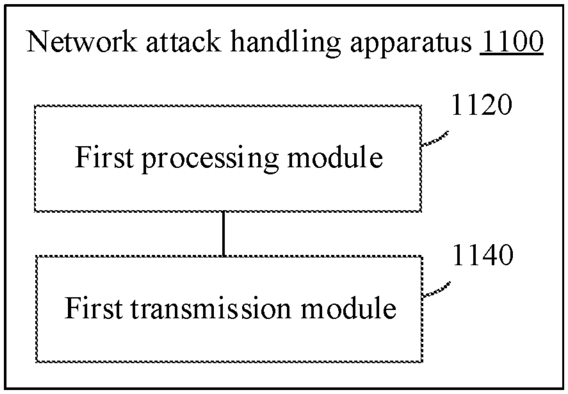
FIG. 11 is a schematic structural diagram of an exemplary network attack handling apparatus according to an embodiment of this disclosure.

FIG. 11 is a schematic structural diagram of an exemplary network attack handling apparatus according to an embodiment of this disclosure. The network attack handling apparatus 1100 may be implemented as all or a part of a SMF or may be applied into the SMF. The network attack handling apparatus 1100 includes:

a first processing module 1120, configured to limit, in a case of identifying a network attack from an electronic device, the electronic device from using a target protocol data unit (PDU) session, the target PDU session carrying a target message, the target message being a message for triggering a core network element to initiate the network attack to the SMF.

In this embodiment of this disclosure, the first processing module 1120 is further configured to limit, in a case of identifying the network attack from the electronic device, the electronic device from using the target PDU session by initiating a release process of the target PDU session performed by the electronic device to a user plane function (UPF).

In this embodiment of this disclosure, a first backoff time is indicated to the electronic device in the release process, the first backoff time being a duration during which the electronic device is prohibited from establishing the target PDU session.

In this embodiment of this disclosure, the first processing module 1120 is further configured to control, in a case of identifying the network attack from the electronic device, the electronic device to stop using the target PDU session by triggering an access and mobility management function (AMF) corresponding to the electronic device and the electronic device to perform a deregistration process.

In this embodiment of this disclosure, a second backoff time is indicated to the electronic device in the deregistration process, the second backoff time being a duration during which the electronic device is prohibited from initiating a registration process.

In this embodiment of this disclosure, the network attack handling apparatus 1100 further includes a first transmission module 1140, configured to control, in a case of identifying the network attack from the electronic device, the electronic device to stop using the target PDU session by transmitting a network attack event to a network management system, the network attack event being used for triggering the network management system to initiate the deregistration process to the AMF corresponding to the electronic device; or further configured to control, by the SMF and in a case of identifying the network attack from the electronic device, the electronic device to stop using the target PDU session by transmitting a network attack event to a network data analytics function (NWDAF), the network attack event being used for triggering the NWDAF to initiate the deregistration process to the AMF corresponding to the electronic device.

In this embodiment of this disclosure, the first transmission module 1140 is further configured to transmit an event exposure notification of an Nsmf interface to the network management system, the event exposure notification being used for notifying the network management system of the network attack event; and In this embodiment of this disclosure, the first transmission module 1140 is further configured to transmit an event exposure notification of an Nsmf interface to the NWDAF, the event exposure notification being used for notifying the NWDAF of the network attack event.

In this embodiment of this disclosure, the event exposure notification of the Nsmf interface carries an identifier of the electronic device, the identifier of the electronic device being used for determining the AMF corresponding to the electronic device.

In this embodiment of this disclosure, the first processing module 1120 is further configured to limit, in a case of identifying the network attack from the electronic device, the electronic device from using the target PDU session by deleting a data radio bearer (DRB) in the target PDU session of the electronic device.

In this embodiment of this disclosure, the first processing module 1120 is further configured to limit, in a case of identifying the network attack from the electronic device, a maximum bit rate (MBR) of the target PDU session by limiting a MBR of the electronic device, and limiting the electronic device from using the target PDU session by limiting the MBR of the target PDU session.

In this embodiment of this disclosure, a maximum bit rate of the electronic device includes at least one of the following: an aggregate maximum bit rate (AMBR) of the electronic device; an AMBR of the target PDU session; and a MBR of a QoS flow in which the target message is located.

In this embodiment of this disclosure, the first processing module 1120 is further configured to determine that the network attack from the terminal is identified in a case that a transmission rate of the DNS query reaches a first threshold.

In this embodiment of this disclosure, the first processing module 1120 is further configured to determine that the network attack from the electronic device is identified in a case that a transmission rate of a domain name system (DNS) query by the electronic device reaches a first threshold.

In this embodiment of this disclosure, the first processing module 1120 is further configured to determine that the network attack from the electronic device is identified in a case that a transmission rate of the DHCP request of the electronic device reaches a second threshold.

In this embodiment of this disclosure, the first processing module 1120 is further configured to determine that the network attack from the electronic device is identified in a case that a transmission rate of the DHCP request of an abnormal type of an electronic device reaches a third threshold. The DHCP request of the abnormal type includes at least one of the following: a duplicate DHCP request and an invalid DHCP request.

Figure 12:
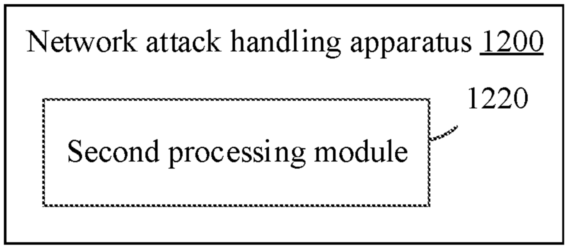
FIG. 12 is a schematic structural diagram of another exemplary network attack handling apparatus according to an embodiment of this disclosure.

FIG. 12 is a schematic structural diagram of another exemplary network attack handling apparatus according to an embodiment of this disclosure. The network attack handling apparatus 1200 may be implemented as all or a part of an electronic device or may be applied into the electronic device. The network attack handling apparatus 1200 includes:

a second processing module 1220, configured to limit, in a case that a session management function (SMF) identifies a network attack from an electronic device, use of a target protocol data unit (PDU) session based on a limitation initiated by the SMF, the target PDU session carrying a target message, the target message being a message for triggering a core network element to initiate the network attack to the SMF.

In this embodiment of this disclosure, the second processing module 1220 is further configured to limit, in a case that the SMF identifies the network attack from the electronic device, the use of the target PDU session by releasing the target PDU session based on the limitation initiated by the SMF.

In this embodiment of this disclosure, the second processing module 1220 is further configured to release the target PDU session by performing a release process of the target PDU session with a user plane function (UPF) based on the limitation initiated by the SMF.

In this embodiment of this disclosure, a first backoff time is indicated in the release process, the first backoff time being a duration during which the terminal is prohibited from establishing the target PDU session.

In this embodiment of this disclosure, the second processing module 1220 is further configured to limit, in a case that the SMF identifies the network attack from the electronic device, the use of the target PDU session by performing a deregistration process with an access and mobility management function (AMF) corresponding to the electronic device based on the limitation initiated by the SMF.

In this embodiment of this disclosure, a second backoff time is indicated in the deregistration process, the second backoff time being a duration during which the terminal is prohibited from initiating a registration process.

In this embodiment of this disclosure, the second processing module 1220 is further configured to limit, in a case that the SMF identifies the network attack from the electronic device, the use of the target PDU session by deleting a data radio bearer (DRB) in the target PDU session of the electronic device based on the limitation initiated by the SMF.

In this embodiment of this disclosure, the second processing module 1220 is further configured to limit, in a case that the SMF identifies the network attack from the electronic device, the use of the target PDU session by limiting a maximum bit rate of the target PDU session based on the limitation initiated by the SMF.

In this embodiment of this disclosure, a maximum bit rate of the electronic device includes at least one of the following: an aggregate maximum bit rate (AMBR) of the electronic device; an AMBR of the target PDU session; and a MBR of a quality of service (QoS) flow in which the target message is located.

In this embodiment of this disclosure, the target message includes: at least one of a DNS query and a DHCP request.

Figure 13:
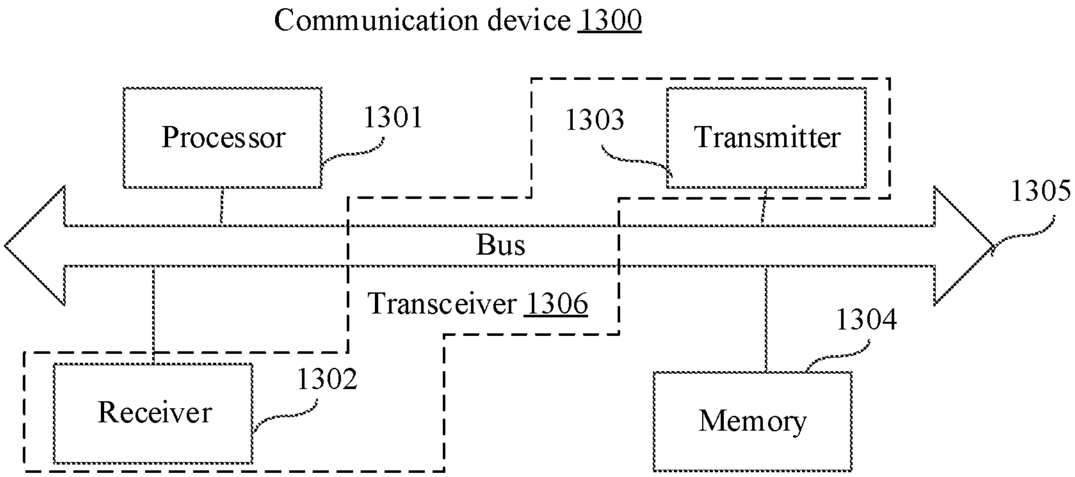
FIG. 13 is a schematic structural diagram of an exemplary communication device according to an embodiment of this disclosure.

FIG. 13 is a schematic structural diagram of an exemplary communication device (an electronic device or a network element device) according to an embodiment of this disclosure. For example, the communication device may be configured to perform the foregoing network attack handling method. Specifically, the communication device 1300 may include: a processor 1301 (including processing circuitry), a receiver 1302, a transmitter 1303, a memory 1304 (including a non-transitory computer-readable storage medium), and a bus 1305.

The processor 1301 includes one or more processing cores, and the processor 1301 performs various functional applications and information processing by running a software program and module.

The receiver 1302 and the transmitter 1303 may be implemented as a transceiver 1306, and the transceiver 1306 may be a communication chip.

The memory 1304 is connected to the processor 1301 through the bus 1305.

The memory 1304 may be configured to store a computer program, and the processor 1301 is configured to execute the computer program to implement various steps performed by the network element device, the access network entity, the core network element, or the core network entity in the embodiments of this disclosure.

The transmitter 1303 is configured to perform the steps related to transmission in the embodiments of this disclosure. The receiver 1302 is configured to perform the steps related to reception in the embodiments of this disclosure. The processor 1301 is configured to perform the steps other than the transmitting and receiving steps in this embodiment of this disclosure.

Further, the memory 1304 may be implemented by any type of volatile or non-volatile storage device or a combination thereof. The volatile or non-volatile storage device includes but not limited to: a random-access memory (RAM), a read-only memory (ROM), an erasable programmable read-only memory (EPROM), an electrically erasable programmable read-only memory (EEPROM), a flash memory or another solid-state memory technology, a compact disc read-only memory (CD-ROM), a high density digital versatile disc (DVD) or another optical memory, a tape cartridge, a magnetic cassette, a magnetic disk memory, or another magnetic storage device.

An embodiment of this disclosure further provides a network element device, including: a first processor and a first memory, the first memory storing a computer program. The computer program is loaded and executed by the first processor to implement the network attack handling method applied to a network element device side provided by the embodiments of this disclosure.

An embodiment of this disclosure further provides an electronic device, including: a second processor and a second memory, the second memory storing a computer program. The computer program is loaded and executed by the second processor to implement the network attack handling method applied to an electronic device side provided by the embodiments of this disclosure.

An embodiment of this disclosure provides a computer-readable storage medium, storing at least one instruction, at least one program, a code set, or an instruction set. The at least one instruction, the at least one program, the code set, or the instruction set, when loaded and executed by a first processor, implements the network attack handling method applied to a network element device side according to the embodiments of this disclosure; or the at least one instruction, the at least one program, the code set, or the instruction set, when loaded and executed by a second processor, implements the network attack handling method applied to an electronic device side provided by the embodiments of this disclosure.

An embodiment of this disclosure further provides a computer program product, including computer instructions, the computer instructions being stored in a computer-readable storage medium. A first processor reads the computer instructions from the computer-readable storage medium, and executes the computer instructions to implement the network attack handling method applied to a network element device side provided by the embodiments of this disclosure; or a second processor reads the computer instructions from the computer-readable storage medium, and executes the computer instructions to implement the network attack handling method applied to an electronic device side provided by the embodiments of this disclosure.

Those of ordinary skill in the art may understand that all or part of the steps of implementing the foregoing embodiments may be implemented by hardware, or may be implemented by a program instructing related hardware. The program may be stored in a computer-readable storage medium. The computer-readable storage medium mentioned may be a read-only memory, a magnetic disk or an optical disc.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A network attack handling method, comprising:

identifying, in a mobile network, a denial of service network attack from an electronic device based on a first transmission rate of domain name system (DNS) queries greater than a first threshold or a second transmission rate of dynamic host configuration protocol (DHCP) requests greater than a second threshold, irrespective of types of the DNS queries and types of DHCP requests; and when the denial of service network attack is identified, limiting, by a session management function (SMF) of the mobile network, use, by the electronic device, of an established protocol data unit (PDU) session for connectivity between the electronic device and the mobile network, wherein the limiting the use includes triggering, by the SMF and when the denial of service network attack is identified, an access and mobility management function (AMF) corresponding to the electronic device to perform a deregistration process with respect to the electronic device.

2. The method according to claim 1, wherein the limiting the use comprises:

initiating, by the SMF, a release process of the PDU session through a user plane function (UPF).

3. The method according to claim 2, wherein the release process includes indication of a first backoff time to the electronic device, the first backoff time being a duration during which the electronic device is prohibited from re-establishing the PDU session.

4. The method according to claim 1, wherein the deregistration process includes indication of a second backoff time to the electronic device, the second backoff time being a duration during which the electronic device is prohibited from initiating a registration process.

5. The method according to claim 1, wherein the triggering the AMF corresponding to the electronic device to perform the deregistration process comprises:

transmitting a network attack event to a network management system, the network attack event triggering the network management system to initiate the deregistration process by the AMF with respect to the electronic device; or transmitting the network attack event to a network data analytics function (NWDAF), the network attack event triggering the NWDAF to initiate the deregistration process by the AMF with respect to the electronic device.

6. The method according to claim 5, wherein the transmitting the network attack event to the network management system includes:

transmitting an event exposure notification of an Nsmf interface based on an SMF service to the network management system, the event exposure notification notifying the network management system of the network attack event, and the transmitting the network attack event to the NWDAF includes:

transmitting the event exposure notification of the Nsmf interface to the NWDAF, the event exposure notification notifying the NWDAF of the network attack event.

7. The method according to claim 6, wherein the event exposure notification of the Nsmf interface carries an identifier of the electronic device, the identifier of the electronic device being used to identify the AMF corresponding to the electronic device.

8. The method according to claim 1, wherein the limiting comprises:

deleting, by the SMF and when the denial of service network attack is identified, a data radio bearer (DRB) in the PDU session of the electronic device.

9. The method according to claim 1, wherein the limiting comprises:

limiting, by the SMF and when the denial of service network attack is identified, a maximum bit rate (MBR) of the electronic device.

10. The method according to claim 9, wherein the MBR of the electronic device comprises at least one of:

an aggregate maximum bit rate (AMBR) of the electronic device;

an AMBR of the PDU session; and an MBR of a quality of service (QOS) flow.

11. A network attack handling method, comprising:

identifying, by a session management function (SMF) in a mobile network, a network attack from an electronic device based on a first transmission rate of domain name system (DNS) queries greater than a first threshold or a second transmission rate of dynamic host configuration protocol (DHCP) requests greater than a second threshold, irrespective of types of the DNS queries and types of DHCP requests; and when the network attack is identified, limiting use, by the electronic device, of an established protocol data unit (PDU) session for connectivity between the electronic device and the mobile network, wherein the limiting the use includes performing, by an access and mobility management function (AMF), a deregistration process with respect to the electronic device, the deregistration process being triggered by the SMF and when the network attack is identified.

12. The method according to claim 11, wherein the limiting the use comprises:

releasing the PDU session based on a release process of the PDU session initiated by the SMF.

13. The method according to claim 12, wherein the release process is performed through a user plane function (UPF).

14. The method according to claim 12, wherein the release process includes indication of a first backoff time to the electronic device, the first backoff time being a duration during which the electronic device is prohibited from re-establishing the PDU session.

15. An apparatus, comprising:

processing circuitry configured to:

identify, in a mobile network, a network attack from an electronic device based on a first transmission rate of domain name system (DNS) queries greater than a first threshold or a second transmission rate of dynamic host configuration protocol (DHCP) requests greater than a second threshold, irrespective of types of the DNS queries and types of DHCP requests; and when the network attack is identified, limit use, by the electronic device, of a protocol data unit (PDU) session for connectivity between the electronic device and the mobile network, wherein, to limit the use, the processing circuitry is configured to trigger, by a session management function (SMF) in the mobile network and when the network attack is identified, an access and mobility management function (AMF) corresponding to the electronic device to perform a deregistration process with respect to the electronic device.

16. The apparatus according to claim 15, wherein the processing circuitry is configured to:

release the PDU session based on a release process of the PDU session initiated by the SMF in the mobile network.

17. The apparatus according to claim 16, wherein the release process includes indication of a first backoff time to the electronic device, the first backoff time being a duration during which the electronic device is prohibited from re-establishing the PDU session.

18. The method according to claim 11, wherein the deregistration process includes indication of a second backoff time to the electronic device, the second backoff time being a duration during which the electronic device is prohibited from initiating a registration process.

19. The apparatus according to claim 15, wherein the deregistration process includes indication of a second backoff time to the electronic device, the second backoff time being a duration during which the electronic device is prohibited from initiating a registration process.

* * * * *